(12) United States Patent
Kaneko

(10) Patent No.: US 7,766,303 B2
(45) Date of Patent: Aug. 3, 2010

(54) ELECTROMAGNETIC VALVE APPARATUS

(75) Inventor: Takashi Kaneko, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/783,694

(22) Filed: Apr. 11, 2007

(65) Prior Publication Data

US 2007/0215827 A1    Sep. 20, 2007

Related U.S. Application Data

(62) Division of application No. 11/002,062, filed on Dec. 3, 2004, now Pat. No. 7,219,876.

(30) Foreign Application Priority Data

Feb. 27, 2004    (JP) .............................. 2004-055203

(51) Int. Cl.
*F16K 31/02* (2006.01)

(52) U.S. Cl. .................... 251/129.16; 335/287; 335/299

(58) Field of Classification Search ............. 251/129.15, 251/129.16; 335/297, 299, 287
See application file for complete search history.

(56) References Cited

U.S. PATENT DOCUMENTS 4,196,751 A  *  4/1980  Fischer et al. .......... 137/625.65
4,546,339 A       10/1985 Kubach
4,666,087 A        5/1987  Jaggle et al.
4,717,118 A        1/1988  Potter
4,976,405 A       12/1990  Graner et al.
5,056,754 A       10/1991  Graner et al.
5,161,779 A  *   11/1992  Graner et al. .......... 251/129.16
5,188,336 A        2/1993  Graner et al.
5,961,045 A  *   10/1999  Coldren et al. ................ 239/90
6,302,371 B1 *   10/2001  Reiter ................... 251/129.21
6,308,667 B1 *   10/2001  Tsai et al. ................ 123/90.11
6,546,945 B2 *    4/2003  Ishigaki et al. ........... 137/15.18
7,044,111 B2      5/2006  Cook
7,097,150 B2 *    8/2006  Sedda et al. ........... 251/129.16

FOREIGN PATENT DOCUMENTS

| JP | 2002-98024 | 4/2002 |
|----|------------|--------|
| JP | 2003-193939 | 7/2003 |

* cited by examiner

*Primary Examiner*—John K Fristoe, Jr.
(74) *Attorney, Agent, or Firm*—Wenderoth, Lind & Ponack, L.L.P.

(57) ABSTRACT

The force to draw an armature of an electromagnetic valve apparatus driving a valve for opening or closing a high-pressure liquid passage is increased and valve bouncing is alleviated by a surface of the core being flat and a surface of the armature facing the surface of the core being shaped convexly spherical. Interference of the surfaces is prevented by a smaller initial gap in a central portion of the faces, even when the armature is installed aslant due to insufficient accuracy of the component parts. Strong electromagnetic attraction can be secured because the smaller the gap is, the stronger the electromagnetic attraction.

2 Claims, 6 Drawing Sheets

When valve closes

ELECTROMAGNETIC VALVE APPARATUS

This is a divisional application of U.S. patent application Ser. No. 11/002,062, filed Dec. 3, 2004, now U.S. Pat. No. 7,219,876.

BACKGROUND OF THE INVENTION

1. Field of the Invention

The present invention is related to an electromagnetic valve apparatus for driving an open/close valve to open or close a high-pressure fuel passage in order to control fuel injection timing and fuel injection quantity used particularly in the fuel injection equipment of an internal combustion engine.

2. Description of the Related Art

Electromagnetic valve apparatus has been known for driving by utilizing electromagnetic force, an open/close valve to open or close a high-pressure fuel passage in order to control fuel injection timing and fuel injection quantity. The electromagnetic valve apparatus comprises a core with a coil embedded therein and an armature located adjacent to the core. The armature is attracted toward the core when magnetic flux generated by electric current in the coil passes through the armature, and thus a valve body connected to the armature is driven.

As the electromagnetic valve apparatus is composed such that the valve body sits on the valve seat in a state in which the armature is attracted toward the core to close the fuel passage, there must be a gap between the core and the armature in the state in which the armature is attracted toward the core. It is required that this gap is as small as possible for securing strong electromagnetic attraction.

However, heretofore, both the surfaces of the core and the armature facing each other have been shaped as flat surfaces (see FIGS. 1, 3, 4, and 5 of Japanese Laid-Open Patent Application No. 2003-193939, and FIGS. 1, 2, and 3 of Japanese Laid-Open Patent Application No. 2002-98024, for example). The valve apparatus has been composed to provide a sufficient initial gap between the surfaces of the core and the armature facing each other so that the end surface of the armature does not interfere with the surface of the core facing the end surface of the armature even when the armature is installed aslant. This is caused by insufficient accuracy of the component parts, since it is difficult from the standpoint of accuracy of the component parts to compose them so that the gap is even allover the surfaces.

SUMMARY OF THE INVENTION

Therefore, there has been a limit to the ability to decrease the initial gap in order to increase the electromagnetic attraction. It has thus been difficult to provide an electromagnetic valve apparatus which is small in size and can exert strong electromagnetic attraction. The first object of the present invention is to solve this problem.

Further, there has been a problem of the occurrence of bouncing-when-closing of the valve body connected to the armature when the armature is attracted toward the core to allow the valve body to close the fuel passage and a problem of occurrence of bouncing-when-opening of the valve body when the valve body is allowed to open the fuel passage. To solve these problems is the second object of the present invention.

The first object is achieved by composing the electromagnetic valve apparatus such that the surface of the core facing the armature is shaped as a flat surface, and the surface of the armature facing to the surface of the core with a small gap between the surfaces is shaped as a convexly spherical or convexly ovally spherical surface. As a result, the gap between the surfaces is smaller in the central part compared to that in the peripheral part of the surfaces.

It may happen that the periphery of the surface of the armature contacts the surface of the core, that is, interference of the surfaces of the armature and core occurs before the valve seats on the valve seat when the armature is attracted toward the core, which results in an incomplete closing of the valve. This can happen in the case where the surfaces of the core and armature facing each other are flat surfaces or curved surfaces facing with the same gap all over the surfaces, if the armature is installed such that the center axis of the armature is inclined to the center axis of the core caused by insufficient accuracy of component parts.

To prevent this, it is necessary to provide a sufficient gap between the surfaces. According to the present invention, the gap between the surfaces is smaller in the central part than in the peripheral part of the surfaces because the surface of the armature is shaped into a convexly curved surface. Therefore, even if the armature is installed inclined by the same angle that may happen in the prior art, interference of the armature and core does not occur. This means that the gap between the surfaces in the central part can be decreased without the occurrence of interference when it happens that the armature is installed aslant caused by insufficient accuracy. Accordingly, it is possible to compose the valve apparatus so that the electromagnetic attraction is increased compared to the prior art.

The first object can be attained also by the surface of the core being shaped into a flat surface and the surface of the armature shaped such that the central part thereof is a flat surface and the surface outer side from the flat surface is a convexly spherical or convexly ovally spherical surface connecting tangentially to the flat surface, that is, so-called crowning is executed. The surface of the armature can also be shaped into a convexly spherical or convexly ovally spherical surface with its central part removed to be formed into a flat surface. The surface of the armature can also be shaped into a flat surface and the surface of the core shaped into a convexly spherical or convexly ovally spherical surface. The surface of the core can also be shaped into a convexly spherical or convexly ovally spherical surface and the surface of the armature shaped into a concavely spherical or concavely ovally spherical surface such that the curvature radius of the concavely spherical surface of the armature is larger than that of the convexly spherical surface of the core. The surface of the core can also be shaped into a flat surface and the armature composed of thin plates piled in the moving direction of the armature such that there is provided a part in which the thin plates are piled such that the nearer to the surface of the flat face of the core, the smaller the plate is in diameter.

Next, the second object of the present invention can be attained by at least one passage hole being provided in the armature, the passage hole having a tapered portion broadening toward the surface of the core facing to the surface of the armature. With this composition of the armature, when the armature is attracted toward the core and the valve connected to the armature closes the high-pressure fuel passage, the fuel rapidly compressed in the gap between the surfaces of the core and armature can escape through the passage hole. The occurrence of bouncing-when-closing of the valve connected to the armature and supported by a spring, is prevented or the bouncing alleviated.

When the electromagnetic attraction is released and the armature is drawn back from the core side by the spring together with the valve connected to the armature to open the valve, the bouncing-when-opening of the valve has a harder time occurring when there is some resistance for the valve to move back. When the passage hole is of constant cross-sectional area, although the occurrence of valve bouncing-when-closing can be suppressed, the occurrence of valve bouncing-when-opening is rather conduced. By making the passage of fuel through the passage hole easier when closing the valve than when opening the valve by forming each passage hole to have a tapered portion broadening toward the surface of the core, the occurrence of valve bouncing-when-closing is prevented or suppressed without excessively conducing the occurrence of valve bouncing-when-opening.

The second object can be attained also by the diameter of the thin plate located remotest from the surface of the armature facing to the surface of the core being about the same as that of the thin plate facing the surface of the core. At least one passage hole penetrating through the piled thin plates, except for the thin plate located remotest from the surface of the armature, is provided such that the passage hole is open toward the surface of the core at the thin plate facing to the surface of the core and is closed by the remotest thin plate.

In this case, the fuel compressed in the gap between the surfaces of the core and armature by rapid attraction of the armature toward the core bends the thin plate located remotest from the surface of the armature to escape through the passage hole, as a result of which the occurrence of valve bouncing-when-closing is prevented or suppressed. When the armature is drawn back from the surface of the core side to open the valve, the fuel below the armature does not pass through the passage hole because the passage hole is closed by the thin plate located remotest from the surface of the armature. Therefore, the occurrence of valve bouncing-when-opening is not conduced. Further, eddy current loss is decreased by composing the armature of piled thin plates.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

FIG. 1 to FIG. 7 are sectional views of the electromagnetic valve apparatus of the first to seventh embodiments according to the present invention in a state in which the valve apparatus is mounted to fuel injection equipment for opening or closing a high-pressure fuel passage thereof with an installed open/close valve.

Figure 1:
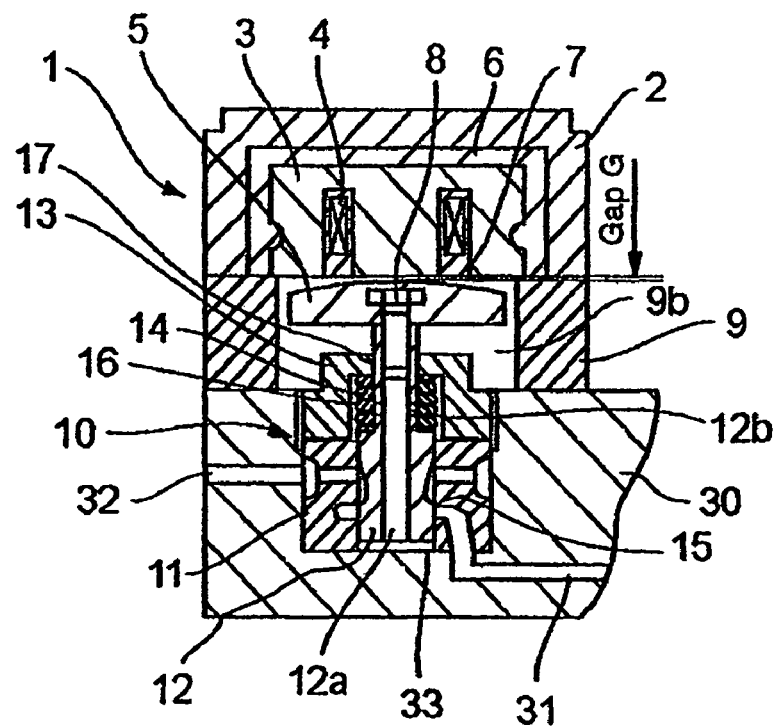
FIG. 1 is a sectional view of an electromagnetic valve apparatus of a first embodiment according to the present invention in a state in which the valve apparatus is mounted with fuel injection equipment for opening or closing a high-pressure fuel passage thereof with an installed open/close valve.

Referring to FIG. 1, reference numeral 1 is an electromagnetic valve apparatus, 10 is an open/close valve device, and 30 is the pump case of a fuel injection pump.

The electromagnetic valve apparatus 1 includes a core 3 (also referred to as an E-shaped core for each embodiment based on the illustration of the core in FIG. 1, e.g.) with a coil 4 embedded therein and an armature 5 (also referred to as an I-shaped armature for each embodiment) covered with electromagnetic valve cases 2 and 9 and mounted to the pump case 30. Reference numerals 6 and 7 are plastic sealing agents. The open/close valve device 10 is composed of a valve seat member 11, a valve body 12 fitted into the valve seat member 11 for reciprocation, and a fixing member 13 for fixing the valve seat member 11 to make it contact closely to a bottom 33 of the valve device mounting part of the pump case 30. The fixing member 13 is screwed in the pump case 30, and a spring 14 is accommodated in the fixing member 13 for pushing the valve body 12 downward.

The armature 5 is fixed to the valve body 12 by means of bolts 8. Reference numeral 15 shows the seating part of the seat member 11 onto which the seating part of the valve body 12 sits when the valve closes. Reference numeral 31 is a high-pressure fuel passage communicating to the plunger chamber and fuel sump near the nozzle needle valve of the fuel injection equipment (not shown in the drawing), and 32 is a low-pressure fuel passage communicating to a fuel tank (not shown in the drawing).

When electric current flows in the coil 4 of the electromagnetic valve apparatus 1, the armature 5 is attracted toward the core 3, and the valve body 12 connected to the armature is lifted upward to sit on the seating part 15 of the seat member 11 to close the high-pressure fuel passage 31. When the valve is closed, the fuel in the high-pressure fuel passage, plunger chamber, and fuel sump near the nozzle needle valve is trapped within a closed space, and the fuel in the space is compressed by the movement of the plunger of the injection pump to be injected from the fuel injection nozzle into the cylinder.

When electric current to the coil 4 is cutoff, the electromagnetic attraction is released, the valve body 12 is pushed down together with the armature 5 by the spring force of the spring 14 until the bottom end of the valve body 12 reaches the bottom 33 of the valve device mounting part of the pump case 30, and the valve is opened at the seating part 15. When the valve is opened, the high-pressure in the closed space in the fuel injection pump is communicated to the low-pressure fuel passage 32 to be returned to the fuel tank, the fuel pressure in the fuel injection pump decreases, and fuel injection ends.

The valve body 12 is provided with a central hole 12a and lateral hole 12b which communicate to the spring chamber 16 formed between the valve body and fixing member 13. The fuel leaking from the sliding portion of the seat member 11 and valve body 12 enters the spring chamber where the spring 14 is accommodated and flows out to armature chamber 9b through a space 17 between the fixing member 13 and the valve body to be returned therefrom to the fuel tank through piping (not shown in the drawing).

When the valve is closed by the seating of the valve body 12 on the seating part 15 of the seat member 11, there must be a gap G between the surfaces of the core and armature, otherwise the surfaces of the core and armature interfere with each other and the valve body 12 does not seat completely on the seating part 15.

The smaller the gap between the surfaces of core and armature is, the stronger the electromagnetic attraction of the core to attract the armature. However, it may happen that the armature is installed such that the center axis of the armature is aslant to the center axis of the core because of insufficient accuracy of the component parts.

Figure 11A:
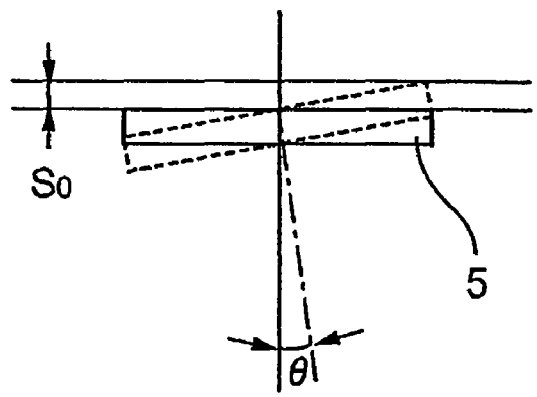
FIGS. 11A and 11B are representations for explaining why the initial gap between the surfaces of the core and armature can be reduced.
Figure 11B:
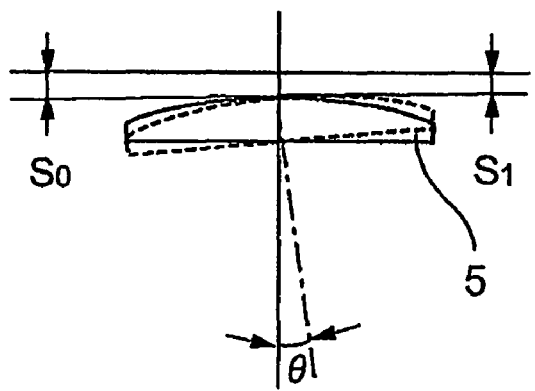

It may happen that the valve body 12 does not seat completely on the seating part 15 when the gap is small caused by insufficient accuracy of component parts. Therefore the dimensions of the components parts must be determined to secure a good margin in initial gap to avoid the interference. The electromagnetic attraction is decreased by the value corresponding to the margin in initial gap. By shaping the surface of the armature into a convexly spherical surface, the margin in initial gap can be reduced. This is recognized by comparing FIG. 11A and FIG. 11B. In FIG. 11A is shown the case where both of the surfaces of the core and armature are flat and the initial gap between both surfaces is $S_0$. In this case, the periphery of the surface of the armature 5 contacts the surface of the core when the armature inclines by an angle θ. In the case where the surface of the armature 5 is shaped into a convexly spherical surface as shown in FIG. 11B, there remains gap $S_1$ when the armature inclines by the same angle of θ. Accordingly, it is possible to reduce the margin in initial gap to a large degree.

Figure 8:
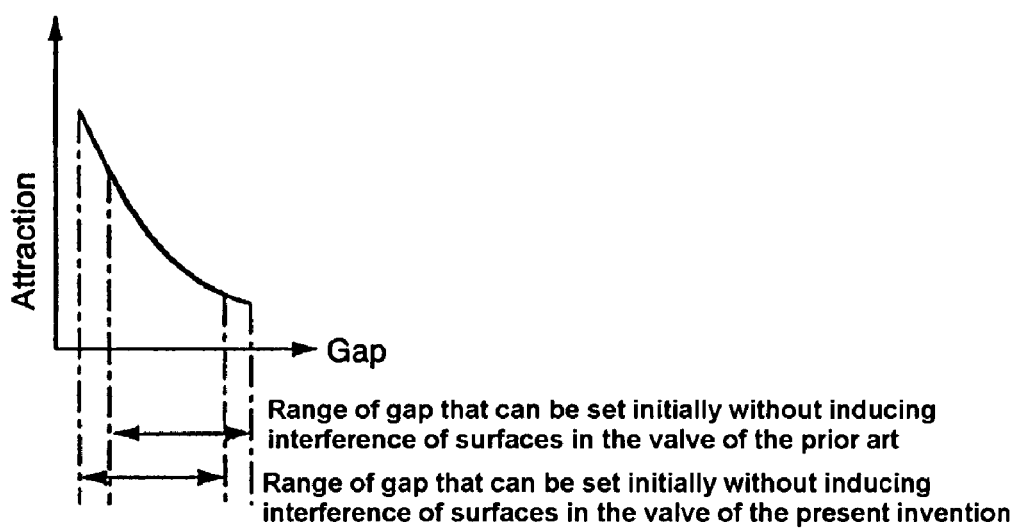
FIG. 8 is a graph showing an increase in attraction force of an electromagnetic valve apparatus of the present invention compared to that of a conventional electromagnetic valve apparatus.

However, when the curvature radius of the convexly spherical surface is too small, the electromagnetic attraction does not increase but instead decreases because of increasing gap in the peripheral part, even if the margin in initial gap is reduced. So the curvature radius is desired to be as large as possible. But it becomes necessary to increase the margin in initial gap when the curvature radius is increased in order to avoid interference of the surfaces of core and armature. With this taken into consideration, the relation between the range of gap that can be set initially without inducing interference of the surfaces with required electromagnetic attraction maintained and the electromagnetic attraction in the case where the surface of the armature is flat or convexly spherical is shown in FIG. 8. In FIG. 8 the abscissa is the initially set gap and the ordinate is the electromagnetic attraction. It is recognized from FIG. 8 that electromagnetic attraction can be increased by shaping the surface of the armature into a convexly spherical surface.

Figure 2:
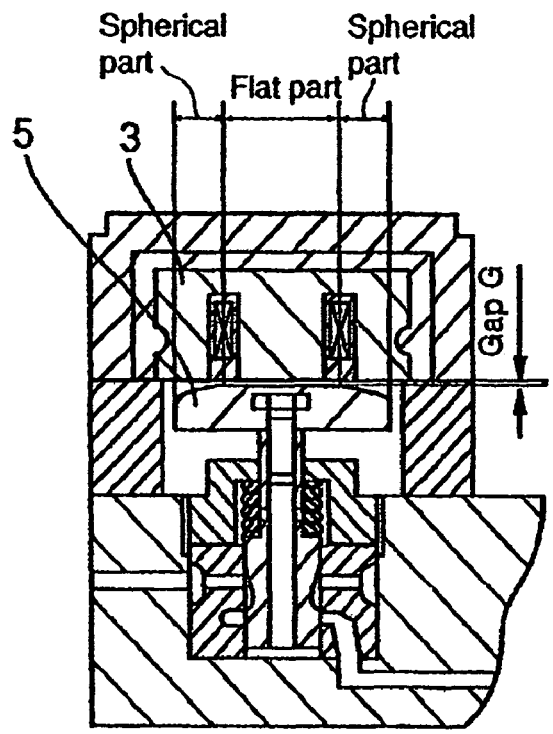
FIG. 2 is a sectional view of an electromagnetic valve apparatus of a second embodiment according to the present invention in the state as shown in FIG. 1.

FIG. 2 shows the second embodiment. The surface of the core 3 is flat and the surface of the armature 5 is shaped such that the central part is flat and peripheral part is spherical connecting tangentially to the flat surface of central part, that is, so-called crowning is executed. Other than that it is the same as the case of FIG. 1 and explanation is omitted. As the diameter of the flat part of the armature is decreased in this embodiment, margin in initial gap can be decreased and a similar effect as in the case of the first embodiment of FIG. 1 can be obtained.

Figure 3:
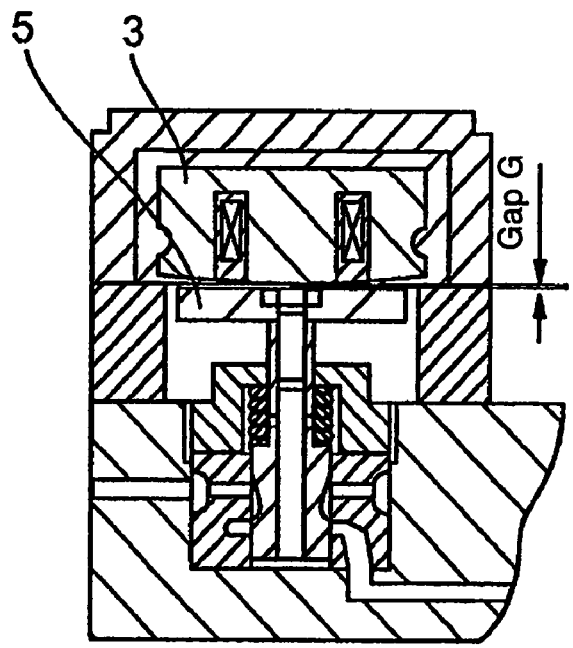
FIG. 3 is a sectional view of an electromagnetic valve apparatus of a third embodiment according to the present invention in the state as shown in FIG. 1.

FIG. 3 shows the third embodiment. The surface of the core 3 is shaped into a convexly spherical surface and the surface of the armature 5 is shaped into a flat surface. Other than that it is the same as the case of FIG. 1, and explanation is omitted. It is easily understood that with this embodiment a similar effect as in the case of the first embodiment of FIG. 1 can be obtained.

Figure 4:
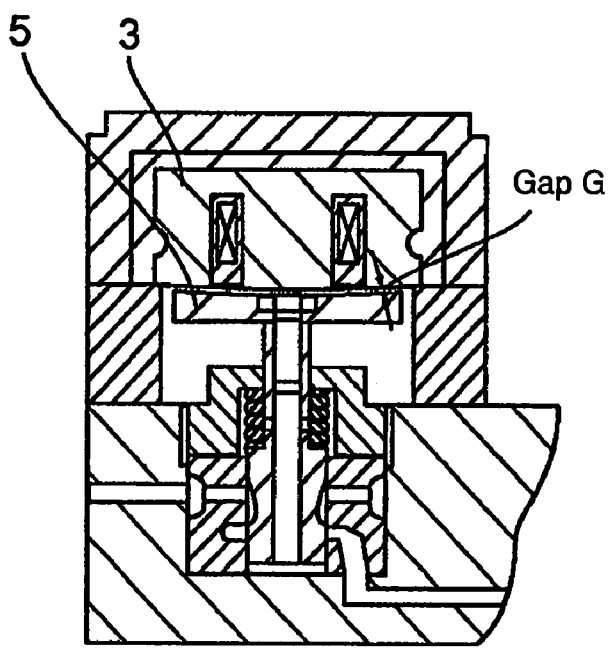
FIG. 4 is a sectional view of an electromagnetic valve apparatus of a fourth embodiment according to the present invention in the state as shown in FIG. 1.

FIG. 4 shows the fourth embodiment. The surface of the core 3 is shaped into a convexly spherical surface and surface of the armature 5 is shaped into a concavely spherical surface such that the curvature radius of the concavely spherical surface is larger than that of the convexly spherical surface. Other than that it is the same as in the case of FIG. 1. and explanation is omitted. It is easily understood that with this embodiment similar effect as in the case of the first embodiment of FIG. 1 can be obtained.

Figure 5:
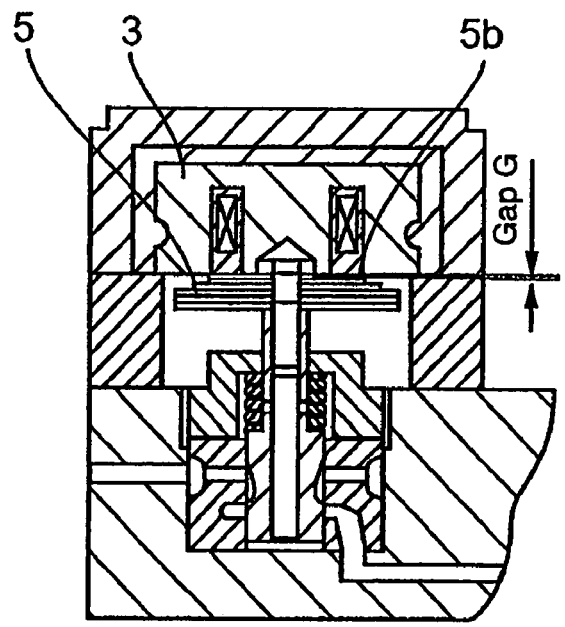
FIG. 5 is a sectional view of an electromagnetic valve apparatus of a fifth embodiment according to the present invention in the state as shown in FIG. 1.

FIG. 5 shows the fifth embodiment. The surface of the core 3 is flat and the armature is composed of thin plates 5b piled such that there is provided a part in which the thin plates are piled such that, the nearer to the surface of the flat face of the core, the smaller the thin plates are in diameter. Other than that it is the same as in the case of FIG. 1, and explanation is omitted. As the diameter of the thin plate 5b located nearest to the core 3 to face the surface of the core directly is small, the margin in initial gap can be decreased and similar effect as in the case of the first embodiment of FIG. 1 can be obtained. In addition, eddy current loss is reduced with this embodiment.

Figure 6:
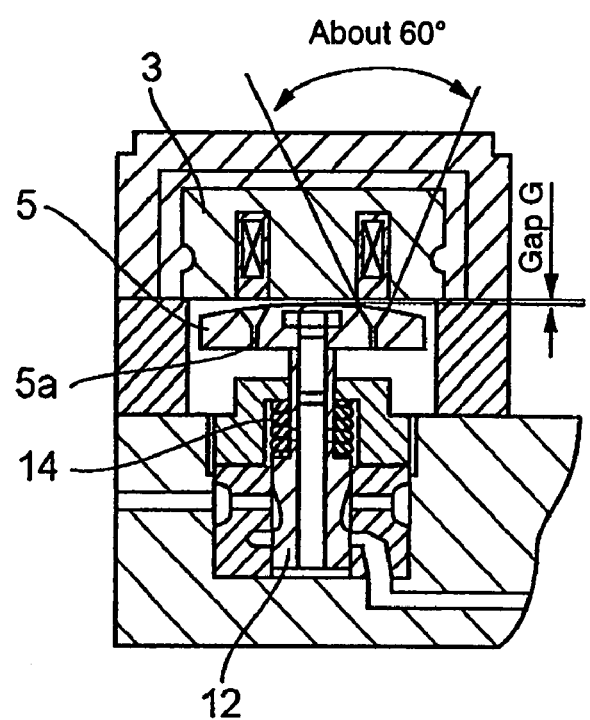
FIG. 6 is a sectional view of an electromagnetic valve apparatus of a sixth embodiment according to the present invention in a state as shown in FIG. 1.

FIG. 6 shows the sixth embodiment. In this embodiment, at least one passage hole is provided to the armature 5 in order to attain the object to prevent the occurrence of valve bouncing-when-closing in addition to increasing the electromagnetic attraction through decreasing the margin in initial gap. When the armature 5 is attracted toward the core 3 to lift the valve body 12 to close the high-pressure fuel passage 31, the fuel in the gap between the surfaces of the core 3 and armature 5 is compressed rapidly, and the valve body 12 supported by the spring 14 begins to oscillate due to the impact of the rapid compression. By allowing the fuel in the gap to escape through the passage hole 5a, the impact is relieved and the occurrence of the oscillation is prevented or suppressed. That is, the occurrence of valve bouncing-when-closing is prevented or suppressed. The passage hole 5a is formed to be broadened upwardly in a cone shape so that the fuel in the gap can escape through the passage hole easily. The best result was obtained with a cone angle of about 60°.

Figure 10:
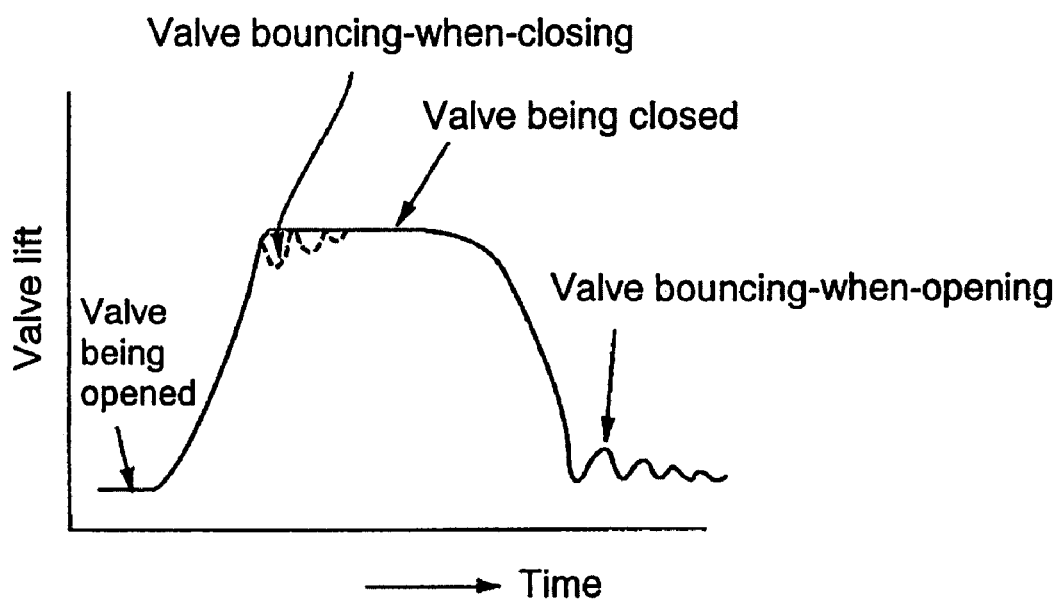
FIG. 10 is a graph showing a state in which the occurrence of valve bouncing-when-closing is prevented in the case of the sixth and seventh embodiments.

FIG. 10 shows valve bouncing. As to valve bouncing, there is bouncing that occurs at valve closing and bouncing that occurs at valve opening. The valve bouncing-when-closing induces fluctuation in injection rate at the beginning of fuel injection. Valve bouncing-when-opening induces deterioration in the sharpness of the end of fuel injection. Both of these affect fuel injection control and engine performance.

Figure 7:
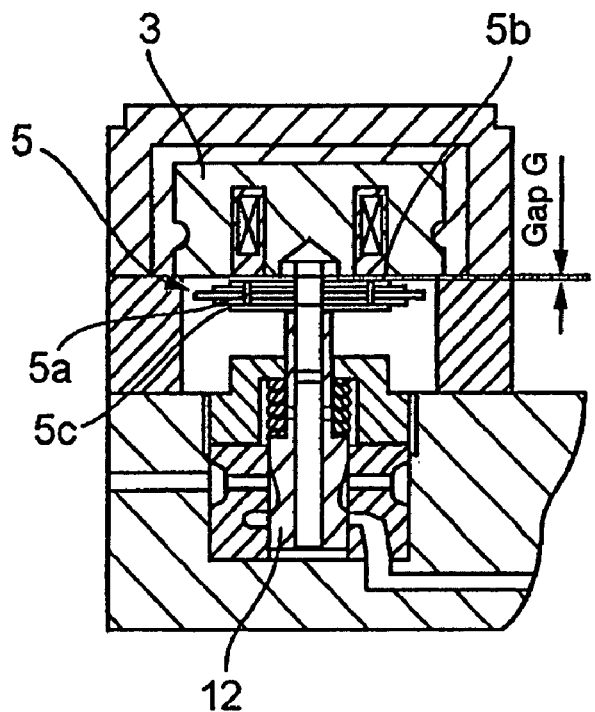
FIG. 7 is a sectional view of an electromagnetic valve apparatus of the seventh embodiment according to the present invention in a state as shown in FIG. 1.

FIG. 7 shows the seventh embodiment. In this embodiment, the armature 5 is composed of piled thin plates as in the case of FIG. 5, but composed such that the diameter of a thin plate 5c located remotest from the core 3 is about the same as that of the thin plate 5b located nearest to the core 3. At least one passage hole 5a is provided to penetrate the thin plates except for the remotest thin plate 5c, the hole passages 5a being closed by the remotest thin plate 5c near the periphery thereof.

Figure 9:
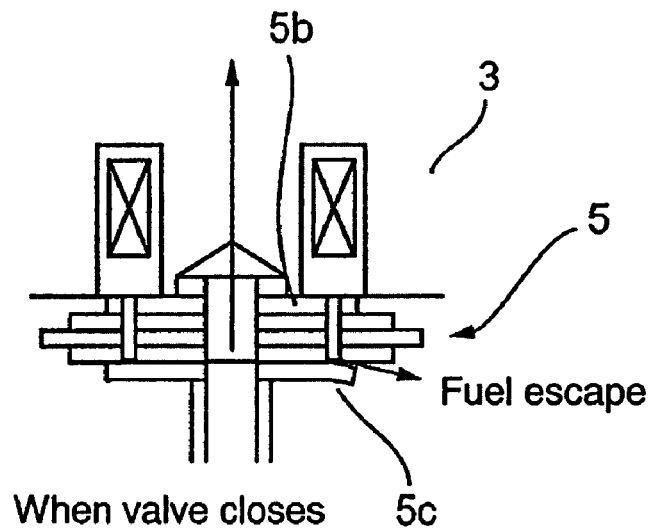
FIG. 9 is a drawing for explaining the working of the electromagnetic valve apparatus of the seventh embodiment when the armature is attracted toward the core to close the valve.

When the armature 5 is attracted toward the core 3 to lift the valve body 12 to close the high-pressure fuel passage 31, the fuel in the gap between the surfaces of the core 3 and armature 5 is compressed rapidly. The thin plate 5c remotest from the core 3 is bent by the pressure of the compressed fuel as shown in FIG. 9 and the fuel escapes through the gap developed by the bending of the thin plate 5c. Therefore, the occurrence of valve bouncing-when-closing can be prevented or suppressed as in the case of the embodiment of FIG. 6. When the armature 5 moves down together with the valve body 12 connected to the armature 5 to open the high-pressure fuel passage 31, the passage hole 5a is closed by the thin plate 5c located at the bottom.

Figure 12A:
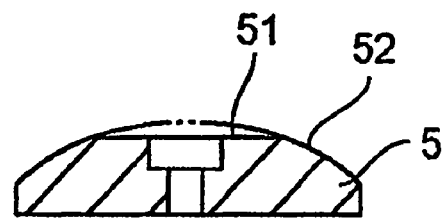
FIGS. 12A and 12B are sectional views of another two embodiments of the armature according to the present invention.
Figure 12B:
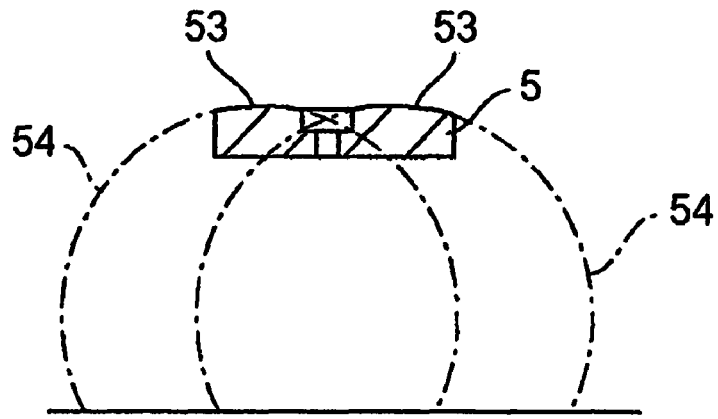

FIG. 12A and FIG. 12B show respectively still other embodiments of the armature 5. In the embodiment of FIG. 12A, after the top face of the armature 5 is shaped into a convexly spherical surface 52, the central part is removed to form a flat surface 51 to provide the initial gap G between the surface of the core 3 and the flat surface 51.

In the embodiment of FIG. 12B, the top face of the armature 5 is shaped to consist of two convexly spherical surfaces 53, 53 by rotating a machining circle 54 around the center of the armature 5. The gap G is formed between the tops of spherical surfaces 53, 53 and the core surface.

As has been described in the foregoing, according to the present invention, as the initial gap between the core and armature can be reduced, the electromagnetic attraction can be increased. Further, by providing a passage hole to the armature such that the fuel in the gap between the surfaces of the core and armature can easily escape from the gap through the hole when the armature is attracted toward the core, with fuel below the armature being rather difficult or impossible to flow through the passage hole toward the gap side when the armature is drawn back from the core side, the occurrence of bouncing-when-closing of the valve for opening or closing the high-pressure fuel passage of a fuel injection equipment can be suppressed or prevented without enhancing valve bouncing-when-opening.

According to the present invention, an electromagnetic valve apparatus can be provided which can be used for controlling injection timing and fuel injection quantity of fuel injection equipment, with which the electromagnetic force by the core to attract the armature can be increased and valve bouncing-when-closing can be prevented or suppressed.

What is claimed:

1. An electromagnetic valve apparatus comprising:
    an E-shaped core having an embedded coil;
    an I-shaped armature located facing said core so as to be able to be driven by electromagnetic force;
    wherein said E-shaped core has a surface facing said I-shaped armature, and said I-shaped armature has a surface located facing said surface of said E-shaped core with a small gap between said surface of said E-shaped core and said surface of said I-shaped armature;
    wherein a gap width of said small gap between said surface of said E-shaped core and said surface of said I-shaped armature is smaller at central parts of said surface of said E-shaped core and said surface of said I-shaped armature than a gap width at peripheral parts of said surface of said E-shaped core and said surface of said I-shaped armature;
    wherein said I-shaped armature has at least one passage hole therein that connects said small gap on one side of said I-shaped armature with a side of said I-shaped armature opposite to said one side so that fluid can flow between said sides; and
    wherein said at least one passage hole has a tapered portion at one side thereof facing the surface of the E-shaped core, said one side is formed in a cone shape broadening toward the surface of the E-shaped core, and another side of said at least one passage hole opposite to the tapered portion of the passage hole is formed in a cylindrical shape.

2. The electromagnetic valve gear according to claim 1, wherein said surface of said E-shaped core is shaped into a flat surface, and said surface of the I-shaped armature is shaped such that the central part thereof is a flat surface and an outer side of said surface from said flat surface is a convexly spherical or convexly ovally spherical surface connecting tangentially to the flat surface, or said surface of said I-shaped armature is shaped into a convexly spherical or convexly ovally spherical surface with the central part removed to be formed into a flat surface.

* * * * *